W. J. DAVIS.
SERIES OF HOLDING VATS.
APPLICATION FILED NOV. 4, 1911.

1,107,764.

Patented Aug. 18, 1914.

WITNESSES:
W. C. Davis
H. H. Berg

William J. Davis
INVENTOR.

BY M. J. Briggs
ATTORNEY.

UNITED STATES PATENT OFFICE.

WILLIAM J. DAVIS, OF CHICAGO, ILLINOIS.

SERIES OF HOLDING-VATS.

1,107,764. Specification of Letters Patent. Patented Aug. 18, 1914.

Application filed November 4, 1911. Serial No. 658,602.

*To all whom it may concern:*

Be it known that I, WILLIAM J. DAVIS, a citizen of the United States, residing in the city of Chicago, in the county of Cook and State of Illinois, have invented a new and useful Series of Holding-Vats, of which the following is a specification.

My invention is concerned with a novel form of valve mechanism for holding vats for pasteurizing milk, etc., of the general character shown in my application No. 716,374, filed August 22, 1912, which valve mechanism is illustrated in the annexed sheet of drawings, in which—

Figure 2:
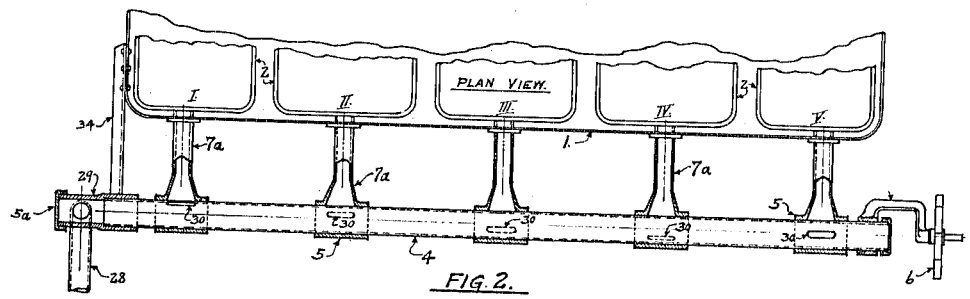
Figure 1:
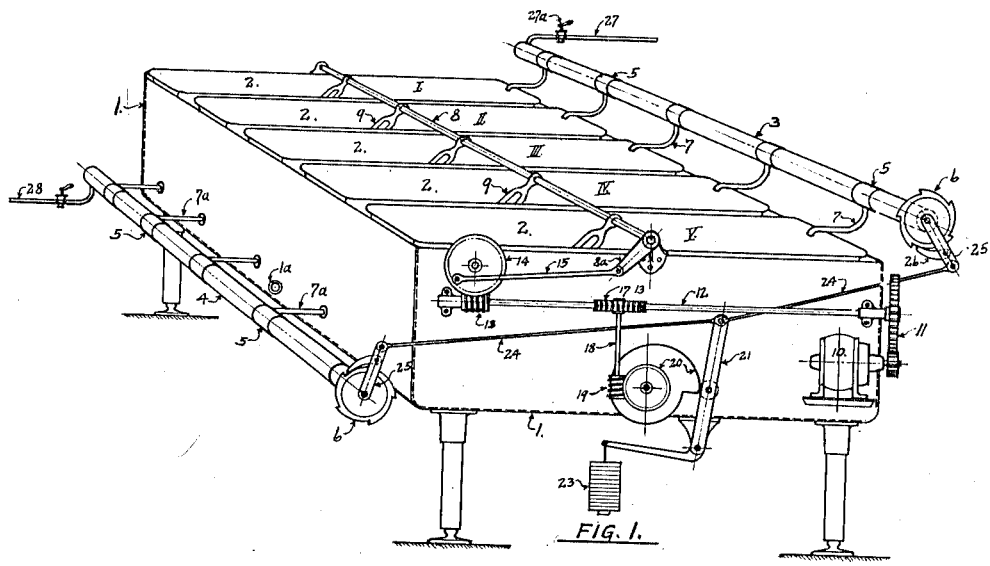
Figures 3, 4:
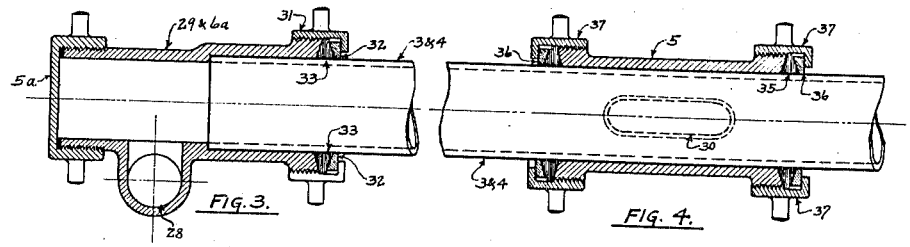

Figure 1. is an illustration in perspective of my apparatus. Fig. 2. is a sectional view of the inlet and outlet pipes. Fig. 3. is a detail showing the section of stuffing box inlet and outlet. Fig. 4. is a detail showing section of sleeve.

Similar figures refer to same parts throughout the drawing.

The tank 1, is of sufficient size to hold all the holding vats 2, 2, 2, with a sufficient volume of steam or liquid around them to preserve the required temperature. The steam or the liquid for maintaining the desired temperature in the contents of the holding vats 2, 2, 2, is introduced into the tank 1, at any desired point in any customary manner, and the overflow of said liquid is carried off by a pipe, not shown, but suitably located at such a point that such steam or liquid will not rise above the top of any of said holding vats 2, 2, 2.

The holding vats 2, 2, 2, may be of any desired number and of any desired capacity, and are rigidly attached to the tank 1, and of sufficient depth that their sides and bottoms may be surrounded by the heating or cooling liquid in the tank 1, yet such liquid can not overflow the tops of said holding vats 2, 2, 2. A branch pipe 7ª leads out of the end on a level with the bottom of each of said holding vats 2, 2, 2, into the sleeve 5, in the outlet pipe 4. An agitator paddle 9, 9, 9, consisting preferably of aluminum, is in each of said holding vats 2, 2, 2, to keep the liquid therein in constant movement, while being treated, so as to preserve a uniform heat therein, and, in case of milk, to prevent the separation of the cream or butter fat from the milk. The inlet pipe 3, preferably of tinned copper, extends horizontally above one end of all of the holding vats and is perforated with a hole opposite each of said vats 2, 2, 2, for the passage of the liquid to be treated into said vats. To one end of said inlet pipe 3 is affixed a ratchet wheel 6, with teeth equal to the number of said holding vats 2, 2, 2. In the other end of said inlet pipe 3 is a inlet stuffing box 6ª Fig. 3, in which the inlet pipe 3 revolves, and into this stuffing box Fig. 3 a continuous flow of the liquid to be treated may be admitted through the pipe 27 or may be cut off by the valve 27ª. Upon one end of said inlet pipe 3 is a cap 5ª closing that end, which may be readily removed to facilitate the cleaning of said pipe 3.

The outlet pipe 4 is a duplicate of the inlet pipe, except that it has an outlet stuffing box 29, upon one end thereof, of similar construction to the inlet stuffing box 6ª and extends along and below the bottoms of the several holding vats 2, 2, 2, and is connected to the said bottoms of said vats 2, 2, 2, by means of branch pipes 7ª, 7ª, 7ª, leading out of the ends of the several holding vats 2, 2, 2, at or near the bottoms thereof.

The valves by which the liquid to be treated may be turned into or cut off from the several holding vats 2, 2, 2, and the valves by which the liquid which has been treated may be released from the several holding vats 2, 2, 2, are formed by the perforations 30, 30, 30, in said pipes 3 and 4, each of which perforations 30, is within a sleeve 5, closely embracing such pipe, which pipe when actuated by their ratchet wheels 6, 6, make a simultaneous partial revolution in said sleeves. In each of said sleeves 5 is an opening connected with a branch pipe leading into or out of the adjacent vat 2. The perforations 30, 30, 30, in said pipes 3 and 4, are so placed therein that at each partial revolution of said pipes 3 and 4 one of said perforations 30, in each of said pipes 3 and 4, coincides with the opening in the sleeve 5, embracing it, thus opening those valves, and all the other perforations 30, 30, 30, in both of said pipes are closed by their respective sleeves 5, 5, 5, such coincidences occurring successively in each such pipes 3 and 4 at each action of the ratchets 6, 6. Said inlet pipe 3 and outlet pipe 4, are so adjusted, in reference to each other, that when any valve at the outlet of any such vat 2, is closed, the valve leading into such vat is, at the same moment, opened. The ratchet wheels 6, 6, on the inlet pipe 3 and on the outlet pipe 4, are so adjusted that they are acted upon and move simultaneously, thus causing the partial revolution of both said pipes 3 and 4.

The inlet pipe 3 enters the inlet stuffing box 6ª and the outlet pipe 4 enters the outlet stuffing box 29, as shown in Fig. 3, and leakage of the liquid in said pipes 3 and 4 is prevented by the packing 33, pressed down by the bevel washer 32, by turning the threaded stuffing box ring 31, upon it, while still permitting the easy revolution of the pipes 3 and 4 within the stuffing boxes 6ª and 29, both stuffing boxes being rigidly attached to the tank 1 by means of the angle irons 34, 34, one of which is shown in Fig. 2, but not elsewhere.

The sleeves 5, 5, 5, embracing the inlet pipe 3 and the outlet pipe 4 and inclosing the perforations 30, 30, 30, in said pipes, have a threaded stuffing box ring 37 upon each end thereof which being turned down upon the bevel washer 36 so compresses the packing 35, upon the surface of said pipes 3 and 4, as to prevent the leakage of the liquid in said pipes, and yet admit for the free revolution of said pipes 3 and 4, in said sleeves 5, 5, 5.

The apparatus is actuated by a motor 10, acting through a spur gearing 11, upon a shaft 12, upon which is a worm 13, acting upon a worm wheel 17, actuating a shaft 18, upon which is a worm 19, acting on a worm wheel upon the cam wheel 20, causing it to revolve slowly. The cam lever 21, actuated by the counter weight 23, and by the cam wheel 20, acting on the connecting rods 24, 24, the ratchet levers 25, 25, and the pawls 26, 26, cause a simultaneous partial revolution of both the inlet and outlet pipes 3 and 4, measured by the number of teeth on the ratchet wheels 6, 6, at each full revolution of the cam wheel 20. Each such partial revolution of the inlet pipe 3 and the outlet pipe 4 opens a valve in the inlet pipe 3 leading into one of said holding vats 2, and opens a valve leading out of the next succeeding holding vat 2, all other valves in both of said pipes being closed. The action of the agitating paddles 9, 9, 9, in all of said holding vats 2, 2, 2, is obtained by a worm 13ª, on the shaft 12, acting on a worm wheel 14, a link 15, actuating the agitating lever 8ª, attached to the paddle shaft 8, to which is rigidly affixed a paddle 9, in each of said holding vats 2, 2, 2, extending down into and nearly approaching the bottoms of each of said holding vats 2, 2, 2.

The construction and operation of my apparatus will, it is believed, be perfectly clear from the foregoing.

Suppose, for instance, that it is desired to destroy the harmful germs in milk, by heating it up to 145° F., and then holding it at that temperature for thirty minutes, and at the same time, secure a continuous flow of milk from the heater into the holding vats, and a continuous flow of milk, after it has been so held, out of the holding vats into the cooling apparatus, and that for this purpose an apparatus consisting of seven holding vats is used: The milk will be turned into holding vat No. 1 at a rate that will require five minutes to fill each vat; the mechanism started at the same time is so adjusted that it requires five minutes for a single revolution of the cam wheel 20, whereupon, the weight 23 forces the cam lever 21 to the left, thus by means of the connecting rods 24, 24, acting upon the ratchet levers 25, 25, and the pawls 26, 26, acting upon the ratchet wheels 6, 6, attached to the ends of the inlet pipe 3, and the outlet pipe 4, forces one-seventh of a revolution of both of said pipes; this closes the valve in the inlet pipe adjacent to and leading into holding vat No. 1 and opens the valve adjacent to and leading into holding vat No. 2, and so on until holding vat No. 6 is filled, when the next partial revolution of said inlet and outlet pipes, not only closes the valve opening into vat No. 6, and opens the valve leading into holding vat No. 7, but also opens the valve leading into the outlet pipe 4 from vat No. 1, which is emptied while vat No. 7 is being filled. At the next partial revolution of the inlet and outlet pipes the valve leading into vat No. 1 is opened, the valve leading into vat No. 7 is closed, while at the same time the valve leading out of vat No. 1 into the outlet pipe is closed and the valve at the outlet of vat No. 2 is opened. At the time when or shortly before the milk is turned on, the tank 1, is filled with hot water of sufficient temperature to maintain the milk at 145° in the holding vats, and the temperature thereof is constantly maintained by a hot water pump or by an injection of steam into the tank 1. During all the time that the mechanism for the actuation of the pipes as above described is in operation, the agitating paddles 9, 9, 9, are being constantly oscillated in the several holding vats 2, 2, 2, thus preventing the separation of the cream from the milk while it is being held in the vats.

Having described my invention, what I claim as new and desire to secure by Letters Patent, is:—

1. In an apparatus of the character described, a tank with a number of separate holding vats therein, an inlet pipe with sides perforated with an opening adjacent to each of said holding vats, sleeves embracing said inlet pipe over each of said openings therein, an opening in each sleeve leading into one of said holding vats; the openings in said inlet pipe being so located that each partial revolution thereof in said sleeves causes one of said openings to coincide with an opening in one of said sleeves, an outlet pipe of same construction as said inlet pipe, sleeves embracing said outlet pipe over each opening therein, an opening in each of said sleeves, each connected with an opening in the bottom of the adjacent holding vat, and mechanism for causing a simultaneous partial revolution of said inlet and said outlet pipes in said sleeves at fixed periods, said inlet and outlet pipes being so adjusted with reference to the positions of the openings in each pipe, that the simultaneous partial revolution of said pipes closes an outlet and opens an inlet of the same holding vat.

2. In an apparatus of the character described, a number of holding vats, an inlet valve and an outlet valve connected with the inlet and the outlet of each of said holding vats, an inlet pipe to conduct liquid to be treated to all of said inlet valves, an outlet pipe to conduct liquid treated from all of said valves, an inlet stuffing box in which one end of the said inlet pipe may revolve, an outlet stuffing box in which one end of said outlet pipe may revolve, sleeves embracing the inlet and the outlet pipes opposite to each holding vat, ratchet wheels affixed to one end of each of said inlet and outlet pipes, and means coöperating with said ratchet wheels to cause a simultaneous-partial revolution of both said ratchet wheels at stated periods.

3. In an apparatus of the character described, a number of separate holding vats, an inlet pipe and an outlet pipe adjacent to the ends of said holding vats, openings in each of said pipes opposite to the end of each holding vat, a removable cap upon one end of both of said pipes, an inlet stuffing box with a removable cap, upon one end of the inlet pipe, an outlet stuffing box, with a removable cap upon one end of the outlet pipe, sleeves embracing each of said pipes covering each opening therein, an opening in each sleeve connected with the adjacent holding vat, the openings in each of said pipes being so located that when an opening therein coincides with an opening in the sleeve, all other openings in such pipe are closed by the sleeves, ratchet wheels affixed to one end of each of said pipes, and means by which a simultaneous partial revolution of both said ratchet wheels is affected, so that coincidence of openings in the pipes with openings in sleeves occur successively at each partial revolution of said pipes, said pipes being so adjusted that the valve opening into a vat is opened and the valve at the outlet of the same vat, is closed simultaneously.

4. In an apparatus of the character described, the combination with a number of holding vats, an inlet pipe closed at one end and having an inlet stuffing box at the other, openings in said pipe adjacent to each of said holding vats, a sleeve covering each of such openings in said pipe with an opening in such sleeve connected with the adjacent holding vat, an outlet pipe closed at one end and having an outlet stuffing box at the other end, openings in said pipe adjacent to each holding vat, a sleeve covering each of such openings in said pipe with an opening in such sleeve connected with the adjacent holding vat, ratchet wheels affixed to an end of each of said pipes, and mechanism which simultaneously at stated periods partially revolves both pipes in the sleeves and stuffing boxes, the openings in each pipe being so located that by each partial revolution thereof, only one opening therein coincides with an opening in a sleeve.

5. In an apparatus of the character described, the combination with a multiplicity of separate holding vats, of an inlet pipe with a removable cap at one of its ends, its sides being perforated with openings, each of said openings leading to one of said holding vats, an inlet stuffing box embracing one end of said pipe, sleeves embracing said pipe and covering each opening therein, an opening in each sleeve corresponding to the opening in said pipe and connected with one of said holding vats, an outlet pipe with removable cap at one of its ends, its sides being perforated with openings, each of said openings leading from one of said holding vats, an outlet stuffing box embracing one end of said pipe, sleeves embracing said outlet pipe and covering each opening therein, an opening in each outlet sleeve corresponding to the opening in said outlet pipe and connected with an opening at or near the bottom of one of said holding vats, and a mechanism for causing periodical partial revolutions of both the inlet and the outlet pipes, simultaneously.

6. In an apparatus of the class described, the combination with a plurality of holding vats, of inlet and outlet pipes for each of said vats, valve mechanism associated with said pipes comprising a rotating hollow member having a plurality of apertures corresponding to the number of vats, said apertures being set in different angular relations to the pipes with which they coöperate, and means for rotating the member step by step, bringing the apertures successively into register with their coöperating pipes so that the vats will be filled seriatim and emptied seriatim after standing while some of the other vats have been emptied and filled.

7. In an apparatus of the class described, the combination with a plurality of holding vats, of inlet and outlet pipes for each of said vats, valve mechanism associated with said pipes comprising a pair of rotating hollow members, each having a plurality of apertures corresponding to the number of the vats, one associated with the inlet pipes and the other with the outlet pipes, said apertures being set in different angular relations to the pipes with which they coöperate, and means for rotating the members step by step, bringing the apertures successively into register with their coöperating pipes so that the outlet pipe for a vat will be opened, then the inlet pipe opened and the outlet pipe closed, and then the inlet pipe closed until the inlet and outlet pipes of the associated vats have been operated to refill them, after which the outlet pipe for the particular vat will again be opened.

In testimony whereof, I have signed my name in the presence of two witnesses this 31st day of October 1911.

WILLIAM J. DAVIS.

Witnesses:
  W. C. DAVIS,
  H. H. BERG.